United States Patent
Fujii (10) Patent No.: US 7,627,580 B2
(45) Date of Patent: Dec. 1, 2009

(54) COMMUNICATION APPARATUS AND NETWORK SYSTEM, AND CONTROL METHOD THEREOF

(75) Inventor: Kenichi Fujii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 11/440,122

(22) Filed: May 25, 2006

(65) Prior Publication Data
US 2006/0282532 A1      Dec. 14, 2006

(30) Foreign Application Priority Data
Jun. 14, 2005     (JP) ............................. 2005-174248

(51) Int. Cl.
*G06F 17/30* (2006.01)
(52) U.S. Cl. .................. 707/10; 709/223; 709/227; 717/102
(58) Field of Classification Search ................. 717/102; 719/328; 709/227, 224, 223, 217; 707/10
See application file for complete search history.

(56) References Cited

U.S. PATENT DOCUMENTS

| | | | | |
|---|---|---|---|---|
| 6,282,678 B1 * | 8/2001 | Snay et al. | ................ | 714/712 |
| 6,970,919 B1 * | 11/2005 | Doi et al. | ................ | 709/220 |
| 7,111,079 B2 * | 9/2006 | Cheng | ................ | 709/249 |
| 7,242,499 B2 * | 7/2007 | Kanda et al. | ................ | 358/1.16 |
| 7,331,059 B2 | 2/2008 | Sameshima et al. | ................ | 726/7 |
| 7,392,435 B2 * | 6/2008 | Bezuidenhout | ................ | 714/48 |
| 7,493,373 B2 * | 2/2009 | Takaluoma et al. | ................ | 709/217 |
| 7,512,949 B2 * | 3/2009 | Creamer et al. | ................ | 718/105 |
| 2005/0177837 A1 * | 8/2005 | Mensah et al. | ................ | 719/328 |
| 2005/0198614 A1 * | 9/2005 | Mavashev et al. | ................ | 717/102 |
| 2006/0041924 A1 * | 2/2006 | Bushmitch et al. | ................ | 725/132 |
| 2006/0064720 A1 * | 3/2006 | Istvan et al. | ................ | 725/38 |
| 2006/0200567 A1 * | 9/2006 | Cousins et al. | ................ | 709/227 |

FOREIGN PATENT DOCUMENTS

| | | |
|---|---|---|
| CN | 1439978 A | 9/2003 |
| EP | 0 511 143 A1 | 10/1992 |

\* cited by examiner

*Primary Examiner*—Jean M Corrielus
(74) *Attorney, Agent, or Firm*—Fitzpatrick, Cella, Harper & Scinto

(57) ABSTRACT

A communication apparatus connected to a network collects functional information for apparatuses on the network and composes the middleware of the communication apparatus based on the collected functional information.

10 Claims, 8 Drawing Sheets

COMMUNICATION APPARATUS AND NETWORK SYSTEM, AND CONTROL METHOD THEREOF

FIELD OF THE INVENTION

The present invention relates to a communication apparatus connected to a network and a network system, and a control method thereof.

BACKGROUND OF THE INVENTION

Capabilities to achieve cooperation in processing via networks have become commonplace even in office devices and home devices. In order to achieve such cooperation in processing, the devices need to have status information indicating their status, state, etc., and profile information indicating their capability, ability, specification, etc., and to exchange the information with each other in a common form of representation using a common communication means. In order to realize such advanced network processing, in device-incorporated software, an approach for managing the software by separating it into a plurality of components, such as one or more pieces of application software, middleware and firmware, is becoming popular.

Application software realizes the main capability of the device. Middleware collectively provides common capabilities within the device, as typified by network control, corresponding to a request from the application software. Firmware achieves control of a hardware capability.

An example of middleware for collectively providing common capabilities within the device as typified by network control is UPnP (Universal Plug and Play). There also exist other protocols, such as Jini, Jxta, and the like, which have similar purposes and capabilities.

UPnP is designed as communication software which requires relatively advanced processing such as HTTP and XML technologies, and it is not easy to always develop and install this for each device individually. Furthermore, if a device for a specific application, such as a printer or a VCR, is developed, for example, it is needless to say that the main capability of the device, a capability specific to the device such as a printing unit or a recording/reproducing capability, should also be developed. Thus, the software for common communication capabilities such as UPnP is generally composed as a separable component in the form of middleware as described above.

In this way, as demand for high-capability devices grows, the middleware in the device-incorporated software is also becoming more advanced and complicated, and computing resources and computing abilities required by the middleware are also increasing accordingly.

Additionally, incorporating higher capabilities into a device with a communication capability has created demand to further incorporate a plurality of such middleware components. For example, in order to realize a device having a communication capability to dynamically support both UPnP and Jini, the device may incorporate two types of corresponding middleware components. Thus, if it is desired that different types of protocols are supported, a plurality of middleware components corresponding to respective protocols would be incorporated within the device.

In this way, incorporating a plurality of middleware components, which are becoming bloated as the device is becoming more advanced and complicated, is a major constraint for a device having a relatively limited computation capability, and how to manage this in an efficient manner becomes a major problem.

In a technique described in EP0511143, an interface object for representing the ability of a software module is sent to a server, and is sent back after being updated at the server. In this case, a module A registers its desired capability with the server first, and then checks to see if the interface object of a module B matches it through the server. By doing this, a determination can be made as to whether or not the module B is needed for the module A.

This technique assumes the presence of a server with which the capabilities of respective software modules are registered and which can be used on a permanent basis. Therefore, this technique is difficult to apply when assuming devices that are used in, for example, a network temporarily established at home, outdoors, or elsewhere. Also, because the technique can only determine whether the module B meets a previously desired condition, it cannot make a determination as to different conditions of a plurality of devices in combination. In other words, the object of the technique of EP0511143 still remains no more than providing a means for detecting what can be done, in a case where a software module is replaced in a system.

Thus, in the prior art optimization can be achieved within a single device. However, they still cannot optimize middleware incorporated in a device having a communication capability, which needs to be optimized in connection with a plurality of devices.

SUMMARY OF THE INVENTION

The present invention consists in solving the above described shortcoming in the prior art.

A feature of the present invention consists in achieving not only optimization on a single-device basis, but also optimization of middleware incorporated in a device having a communication capability at a level of device network.

According to the present invention, there is provided with a communication apparatus connected to a network comprising:

collection means for collecting functional information for apparatuses on the network, and composition means for composing middleware based on the functional information collected by the collection means.

Further, according to the present invention, there is provided with a control method of a communication apparatus connected to a network comprising:

a collection step of collecting functional information for apparatuses on the network, and a composition step of composing middleware based on the functional information collected in the collection step.

Further, according to the present invention, there is provided with a control method of a network system in which a plurality of devices are connected via a network, comprising:

a collection step of collecting device-capability information for each of the plurality of devices via the network, and a composition step of composing middleware based on the device-capability information collected in the collection step.

Furthermore, according to the present invention, there is provided with a network system in which a plurality of devices are connected via a network, comprising:

collection means for collecting device-capability information for each of the plurality of devices via the network, and composition means for composing middleware based on the device-capability information collected by the collection means.

Other features, objects and advantages of the present invention will be apparent from the following description when taken in conjunction with the accompanying drawings, in which like references designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of the present invention is described below in detail with reference to the accompanied drawings. It should be understood that the following embodiment is not intended to limit the invention according to the claims and that not all of the combinations of the features described in the present embodiment should be required for a solution of the invention.

Figure 1:
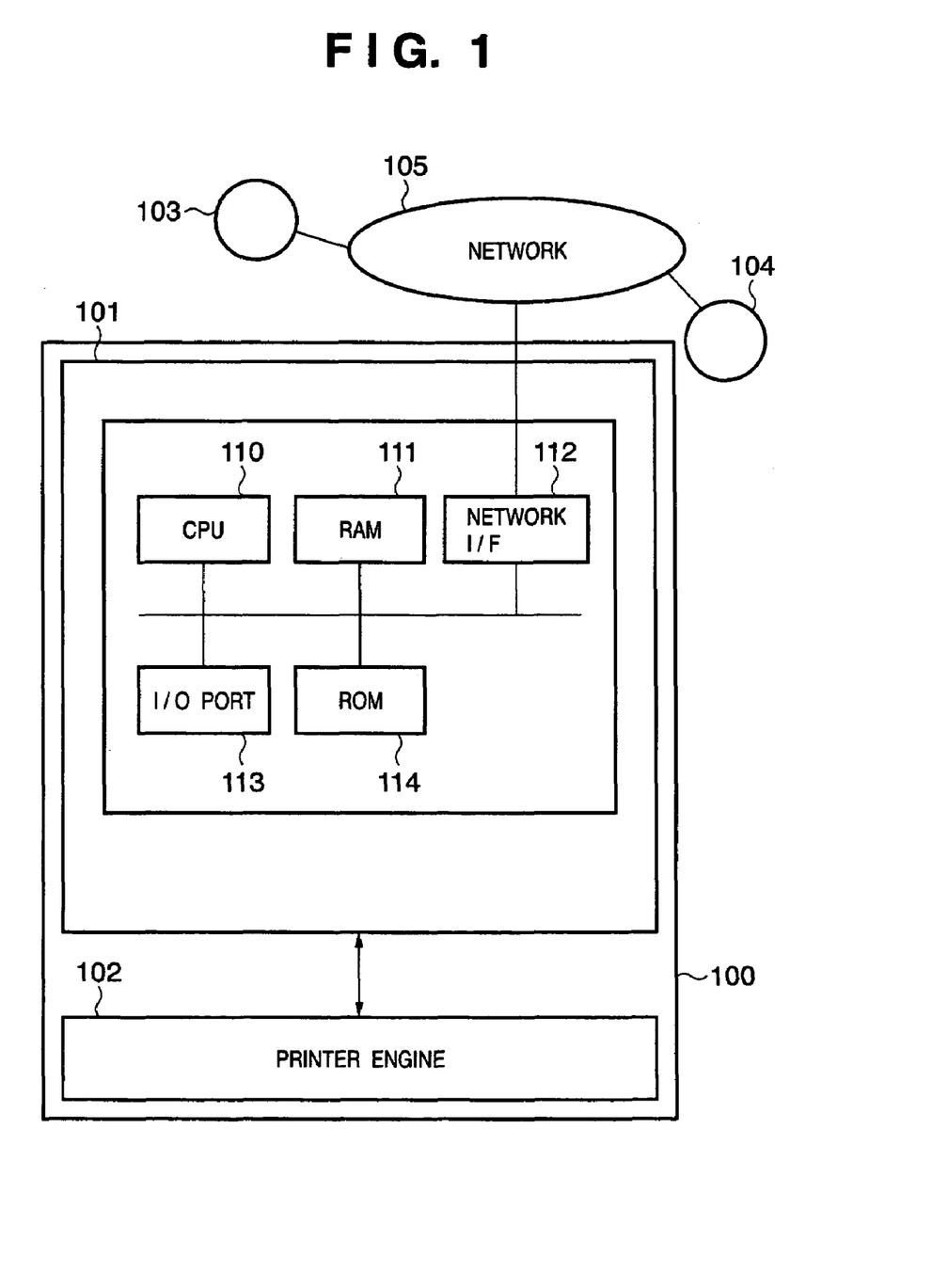
FIG. 1 is a block diagram illustrating the configuration of an image forming apparatus as an example of an apparatus carrying out processing according to an embodiment of the present invention.

FIG. 1 is a block diagram illustrating the configuration of an image forming apparatus (color printer) as an example of an apparatus carrying out processing according to an embodiment of the present invention. Note that although the following description refers to the case of the color printer by way of example, the present invention is not limited to this, but can be applied to, for example, office devices such as personal computers (PCs), copy machines or facsimiles, as well as home electric appliances such as DVD recording/reproducing devices.

In the figure, a controller 101 controls the overall operation of the color printer 100. A printer engine 102 is a printer engine that forms an image on a recording medium, such as a recording sheet, using an ink-jet printing method or a photo-electric printing method. A network 105 also connects with a plurality of various devices 103, 104, including home electric appliances and office devices, for example, in addition to the printer 100. Although only two devices 103, 104 are shown here, it is needless to say that the number of these devices is not limited to this.

A CPU 110 controls the operation of the printer 100 according to a program stored in a ROM 114. A RAM 111 is used as a work area which temporarily stores various types of data when they are being processed by the CPU 110. An input/output (I/O) port 113 inputs and outputs various types of signals between respective units such as the printer engine 102 and the CPU 110. A network interface 112 controls communications from/to the network 105 and enables data exchange with the various types of devices connected to the network 105.

Figure 2:
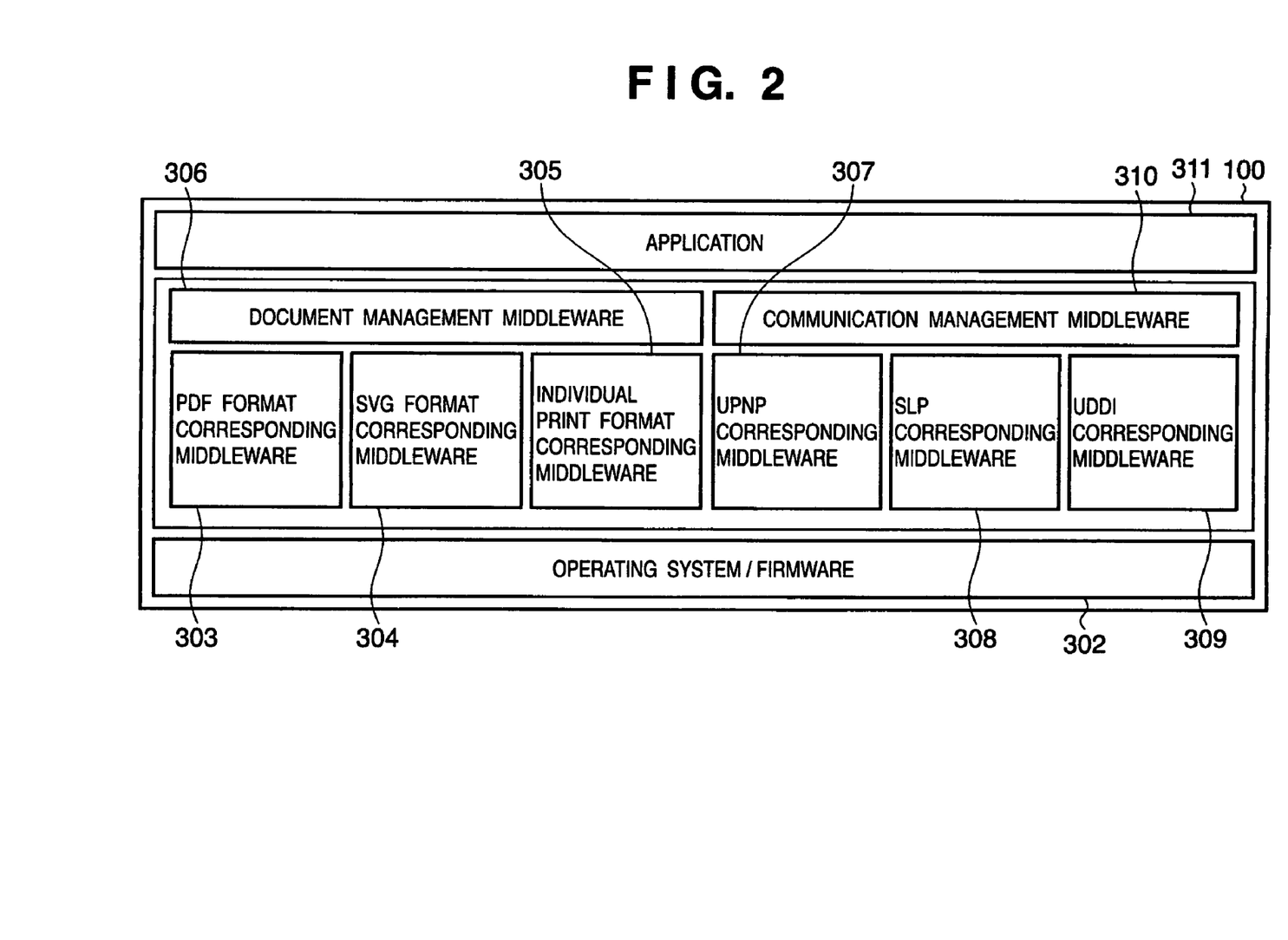
FIG. 2 depicts a view illustrating the composition of software incorporated in a color printer according to the embodiment of the present invention.

FIG. 2 depicts a view illustrating the composition of software incorporated in the color printer 100 according to the embodiment of the present invention. This program is stored in the ROM 114 of the controller 101.

The color printer 100 is a device incorporating capabilities according to the embodiment of the present invention, and is assumed here to be a high-capability color printer connectable to the network 105. It is assumed that the color printer 100 is, just like other typical printers, provided with additional capabilities for print data management, reprinting, history management and the like, in addition to a capability of receiving document data or print data from a client such as a PC and printing it in full color. With regard to the software composition of the color printer 100, it has operating system/firmware 302 in the first place that provides basic processing. Further, on the upper layer of it is a layer of middleware components 303 to 310 that provide respective common capabilities. On the top-most layer is an application 311. The application 311 is used to provide the additional capabilities of the printer 100 and performs, for example, the above described history management. Although, in the figure, only one application 311 is shown for the sake of convenience, there may be a plurality of applications.

The middleware components 303 to 310 are now described in detail.

Indicated by the reference numerals 303 to 306 is middleware that manages document data including print data which has reached the printer 100. This middleware for managing document data is composed of middleware components 303 to 305, which correspond to respective data formats, and document management middleware 306, which further integrates these components and provides an interface for allowing them to be handled from the application 311. The middleware components 303 to 305 corresponding to respective data formats include, for example, PDF format corresponding middleware 303, SVG format corresponding middleware 304 and individual print format corresponding middleware 305. These middleware components 303 to 305 and 306 have a hierarchical structure, in which the middleware components 303 to 305 appear to be managed through the document management middleware 306 to the application 311.

On the other hand, indicated by the reference numerals 307 to 310 is middleware that implements communications over the network 105. This middleware for processing communications, as with the document management middleware 306, is composed of middleware components 307 to 309, which correspond to respective communication protocols, and communication management middleware 310, which further integrates these components and provides an interface for allowing them to be handled from the application 311. The middleware components 307 to 309 corresponding to respective communication protocols include, for example, UPnP. corresponding middleware 307, SLP (Service Location Protocol) corresponding middleware 308 and UDDI corresponding middleware 309. These middleware components 307 to 309 and 310 have a hierarchical structure, in which the middleware components 307 to 309 appear to be managed through the communication management middleware 310 to the application 311.

Figure 3:
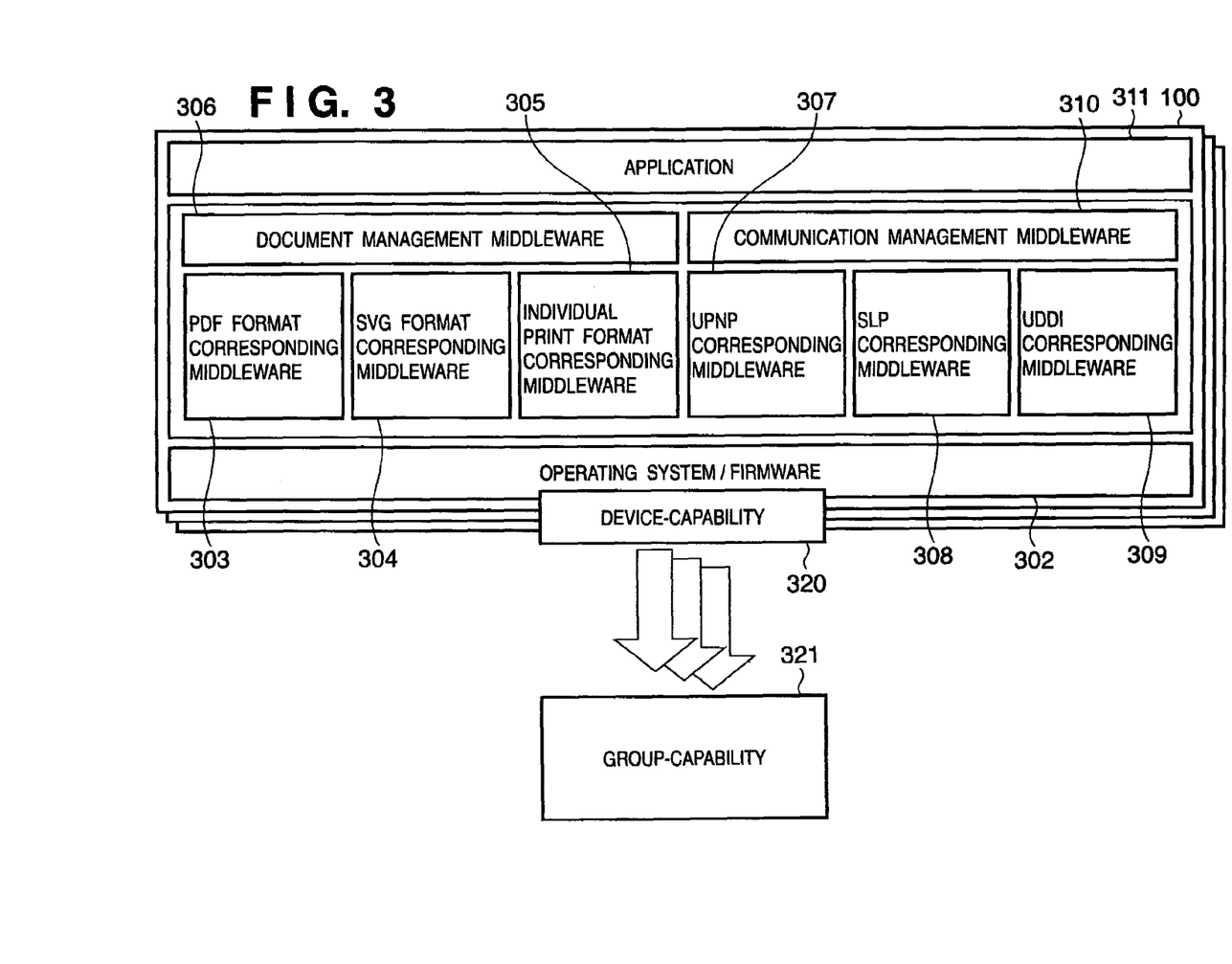
FIG. 3 depicts a view conceptually illustrating processing which takes place when the color printer according to the embodiment of the present invention is powered on and starts running.

FIG. 3 depicts a view conceptually illustrating processing which takes place when the color printer 100 is powered on and starts running.

First, information about capabilities of the operating system/firmware 302, the application(s) 311 and respective software components stored in the color printer 100 is collected to generate a device-capability 320 which is capability information of this printer 100. In the other devices 103, 104, device-capabilities 320 of their own are also generated in a similar way. Then, these are communicated by the respective devices through the network 105 to form a group-capability 321 of the network 105. The content of the group-capability 321 here, which is composed of the device-capabilities 320, varies depending on what capabilities or abilities the devices connected to the network 105 have. By way of example, capability information such as communication protocols usable in common or supported data formats may be generated as a group-capability 321.

Figure 4:
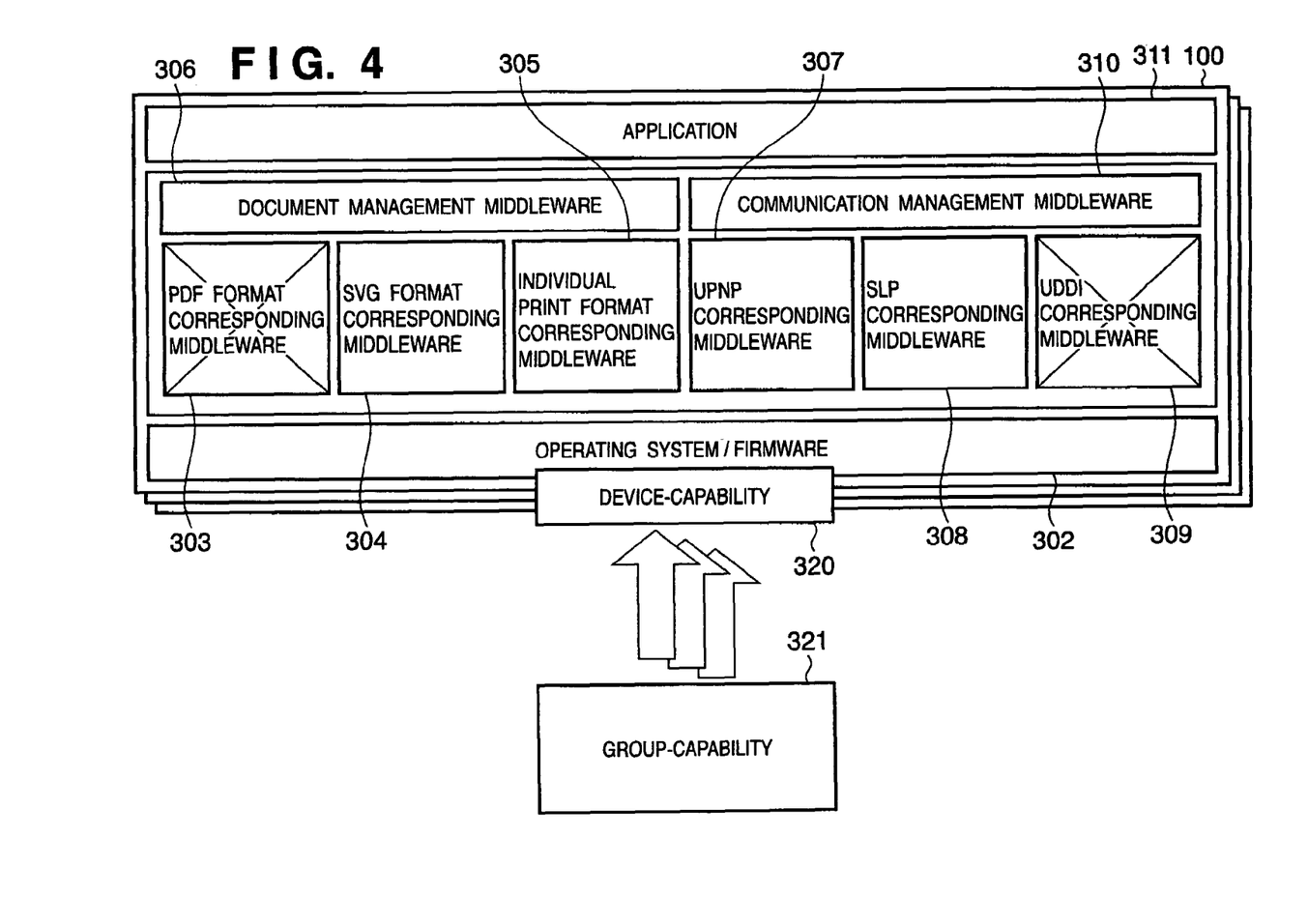
FIG. 4 depicts a view illustrating a state in the color printer according to the embodiment of the present invention, in which a number of middleware components incorporated in the color printer have been inactivated by optimization processing using a group-capability and device-capabilities.

FIG. 4 depicts a view illustrating a state in the color printer 100, in which the use of a number of the middleware components incorporated in the color printer 100 have been inactivated by optimization processing using the group-capability 321 and the device-capabilities 320. An example of processing in which the color printer 100 gets into this state is described below.

First, a fact that none of the devices connected to the network 105 use UDDI as a communication means (a means for searching for each other) is derived based on the group-capability 321 computed from the device-capabilities of the devices. As a result, the UDDI corresponding middleware 309 at the respective devices is inactivated (marked with "X" in FIG. 4). Furthermore, another fact that none of the input devices connected to the network 105 support data transmission in a PDF format is derived from the group-capability 321. In this case, a determination is made that there is no possibility that the PDF format corresponding middleware 303 at the color printer 100, which is an output device, will be used, and it is inactivated (marked with "X" in FIG. 4).

It should be noted here that the capability that can be offered to users by the color printer 100 including the application 311 in this situation remains unchanged. That is, neither the UDDI corresponding middleware 309 nor the PDF format corresponding middleware 303 can be used by any devices on the current network 105. Therefore, inactivating these middleware components does not make any change to the capability that the device network 105 including the color printer 100 can offer to the users.

The application 311 also continues to perform the processing of communications through the communication management middleware 310 and the processing of document management through the document management middleware 306. Therefore, it is not affected by inactivating the UDDI corresponding middleware 309 and the PDF format corresponding middleware 303.

Figure 5:
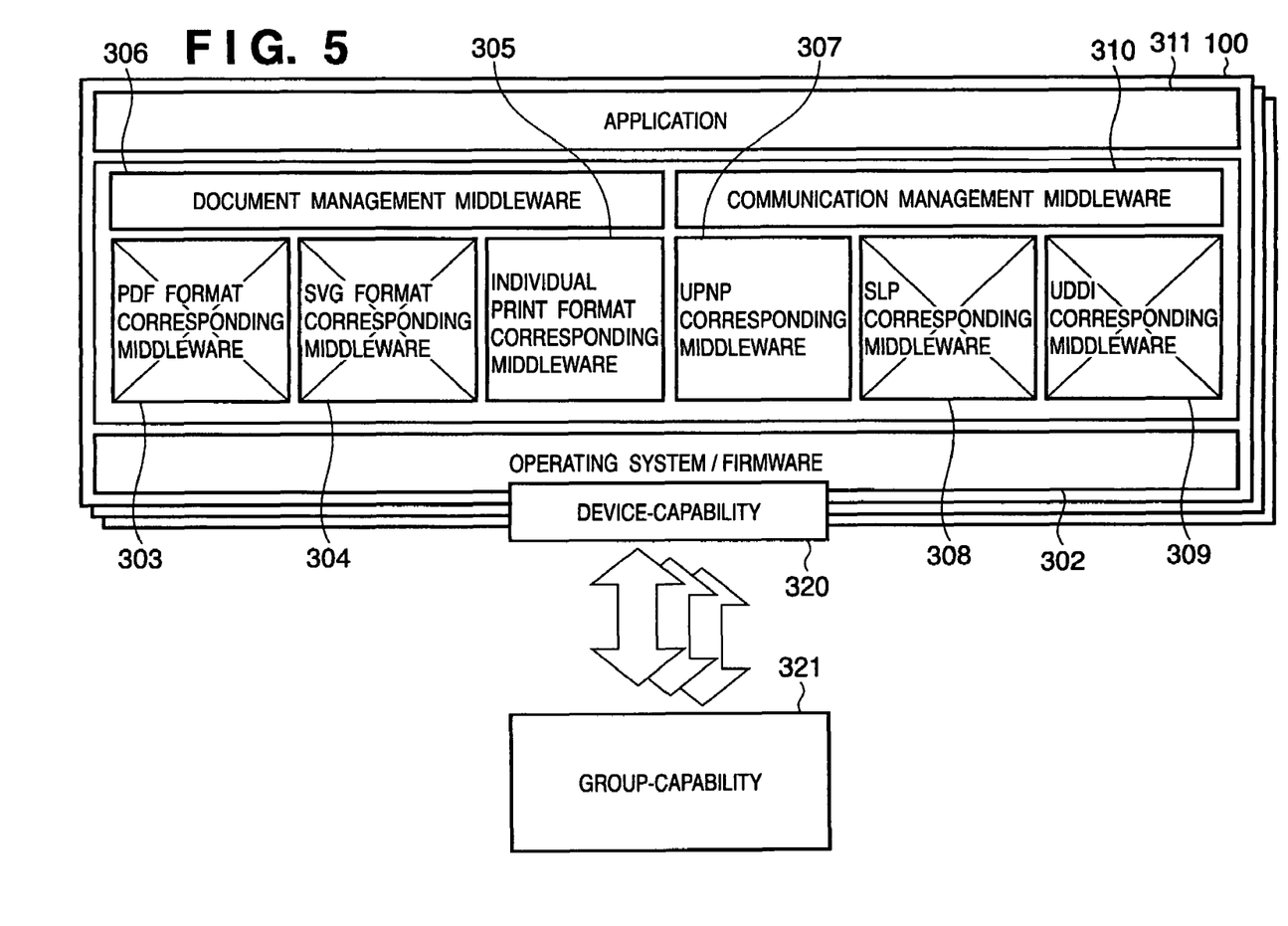
FIG. 5 depicts a view illustrating a case in which recursive optimization is performed by regenerating group-capability information from modified device-capability information.

FIG. 5 depicts a view illustrating a case in which recursive optimization is performed by further regenerating the group-capability information 321 from the modified device-capability information 320 as described above.

Typically, this is recursively processed in connection with convergence conditions such as time or the number of times. Shown here is a case in which it has also been determined that the SLP corresponding middleware 308 and the SVG format corresponding middleware 304 may be inactivated.

In this way, the color printer 100 according to the embodiment of the present invention does not need to keep all of the plurality of the middleware components held in it serviceable. Therefore, based on the conditions and abilities of the devices on the network 105, the middleware components except for those which are really in need can be inactivated.

It should be noted that although the embodiment of the present invention describes an operation in which the respective middleware components are previously activated before the optimization by the group-capability 321 and inactivated after the optimization, the present invention is also applicable to an operation in which the respective middleware components are previously inactivated and activated if necessary. It is also applicable when the optimization is implemented by combining the controls of activation and inactivation individually.

Further, if the printer 100 capable of printing images in full color has the color management middleware corresponding to a color printer and black and white is optimized as follows. If a digital camera is connected to the network 105, for example, it is determined that a color management capability for enhancing the color reproducibility in printing of the image data taken by the digital camera is required. In such a case, capability information including the color management capability is generated as the group capability 321. In this case, the color management middleware corresponding to a color printer is not inactivated (or activated). On the other hand, the color management middleware corresponding to black and white is inactivated (or not activated).

Conversely, if no digital camera exists but a black and white scanner is connected to the network 105 instead, capability information including a black and white printing capability in a draft mode is generated to follow high-speed scanning. In this case, the color management middleware corresponding to the black and white is not inactivated (or activated). On the other hand, the color management middleware corresponding to the color printer is inactivated (or not activated).

Figure 6:
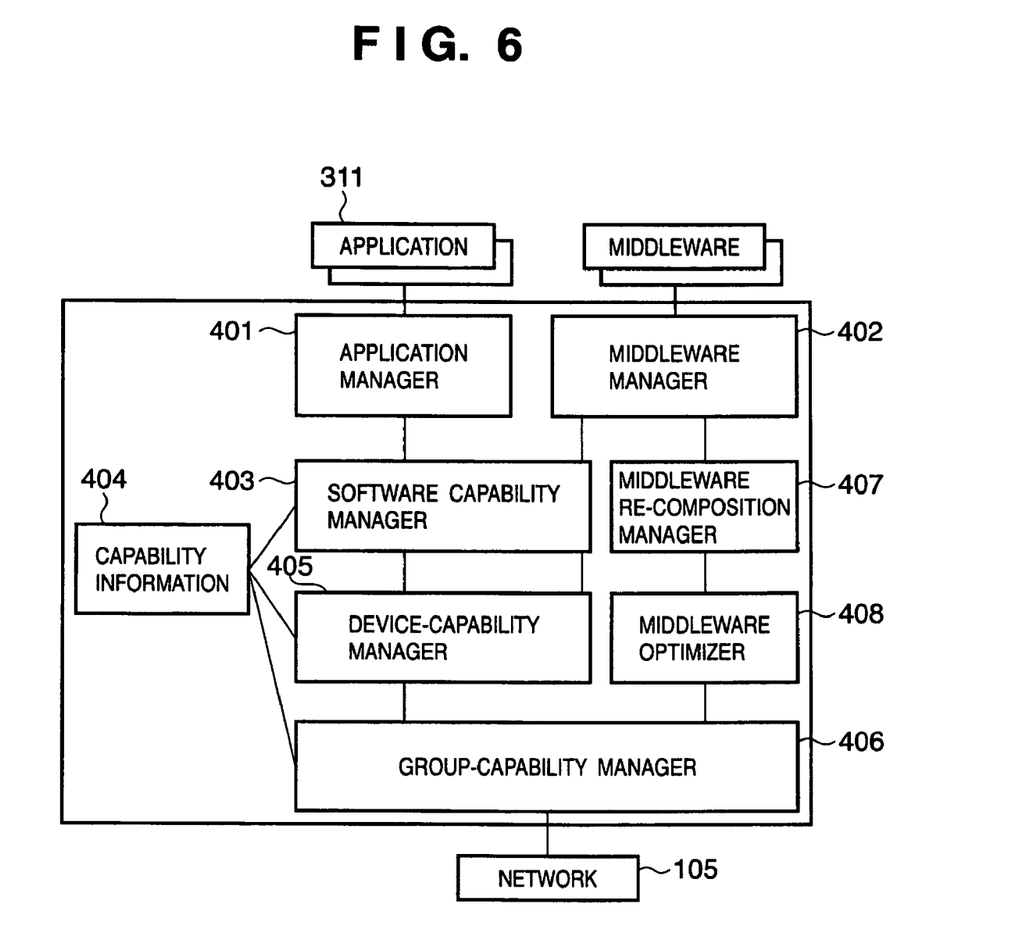
FIG. 6 is a functional block diagram in the software composition of the color printer according to the embodiment of the present invention.

FIG. 6 depicts a functional block diagram in the software composition of the color printer 100 according to the embodiment of the present invention.

An application manager 401, in a network corresponding device capable of controlling through the network 105, manages and stores one or more application software components for implementing the main capability of the device. The application manager 401 stores the application 311. A middleware manager 402, corresponding to a request from the application 311, manages and stores one or more middleware components 303 to 310 for collectively providing common capabilities of the printer 100, such as network control in particular, on a concurrent basis.

A software capability manager 403 gives capability information 404 to each of the various types of software components including the firmware, the middleware as described above and the application software 311, and manages them. The capability information 404 includes status information indicating the status, state, etc. of the device and profile information indicating the capability, ability, specification, etc. of the device. The firmware achieves the control of the hardware capability of the printer 100. The middleware manager 402 manages the middleware to be managed using the capability information 404 given by the software capability manager 403. The capability information 404 here stores information that hierarchically represents the mutual functional dependency among the middleware components.

A device-capability manager 405 generates device-capability information, which is capability information on a device-by-device basis, based on the capability information 404 in a plurality of device-incorporated software components provided by the software capability manager 403. A group-capability manager 406 collects the device-capability information 320 provided by the device-capability manager 405 via the network 105. Then, it computes the group-capability information 321 for a group of devices consisting of the plurality of devices on the network 105. A middleware re-composition manager 407 dynamically re-composes the device-incorporated middleware components while the printer 100 is operating. A middleware optimizer 408 optimizes the middleware stored on the respective devices through the middleware re-composition manager 407 based on the group-capability information 321 generated by the group-capability manager 406.

Figure 7:
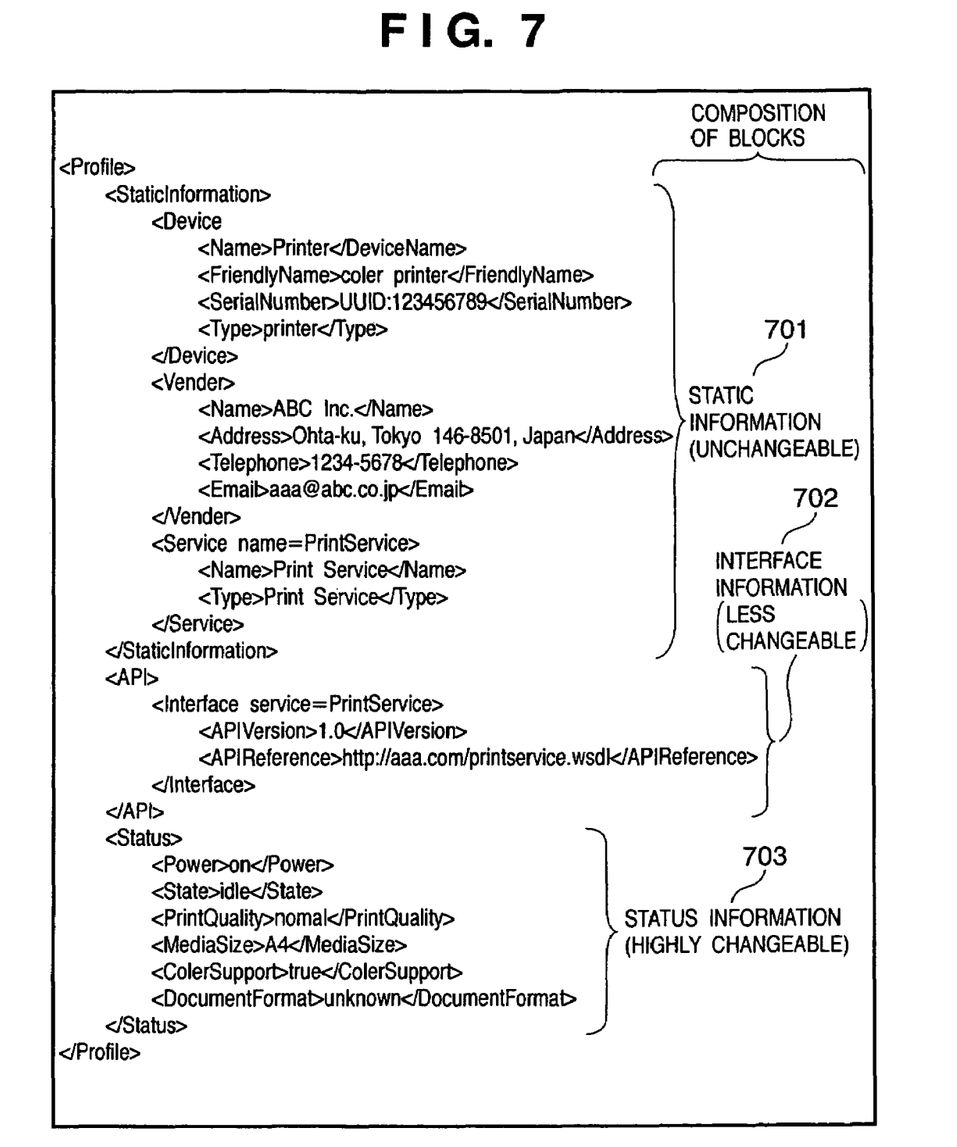
FIG. 7 depicts an example of capability information processed in a software capability manager according to the embodiment of the present invention.

FIG. 7 depicts an example of the capability information 404 processed in the software capability manager 403 according to the embodiment of the present invention.

The elements that constitute the capability information 404 have a hierarchical multi-layered structure, which allows for obtaining necessary information only by following the hierarchy. Further, the capability information 404 is made up of three blocks, i.e. static information 701 that is unchangeable, interface information 702 that is less changeable and status information 703 that is highly changeable, depending on the probabilities of changes made to the respective pieces of information. In addition, the structure allows for changing the processing method for each block. Note that although in FIG. 7 the profile information consists of three blocks based on the changeability, the number of these blocks is not limited to three. Neither is the method for blocking to the one based on the changeability.

In the example shown in the figure, the static information 701 describes the vendor name and the service name of the printer 100, which are fixed. The interface information 702 describes an interface service, the version of API, a URL, and the like. The status information 703 describes the status of the printer 100, print quality, paper size enable/disable to print in color, the format of a document to be printed, etc. These may vary at any time depending on the state of the printer or the print job.

Figure 8:
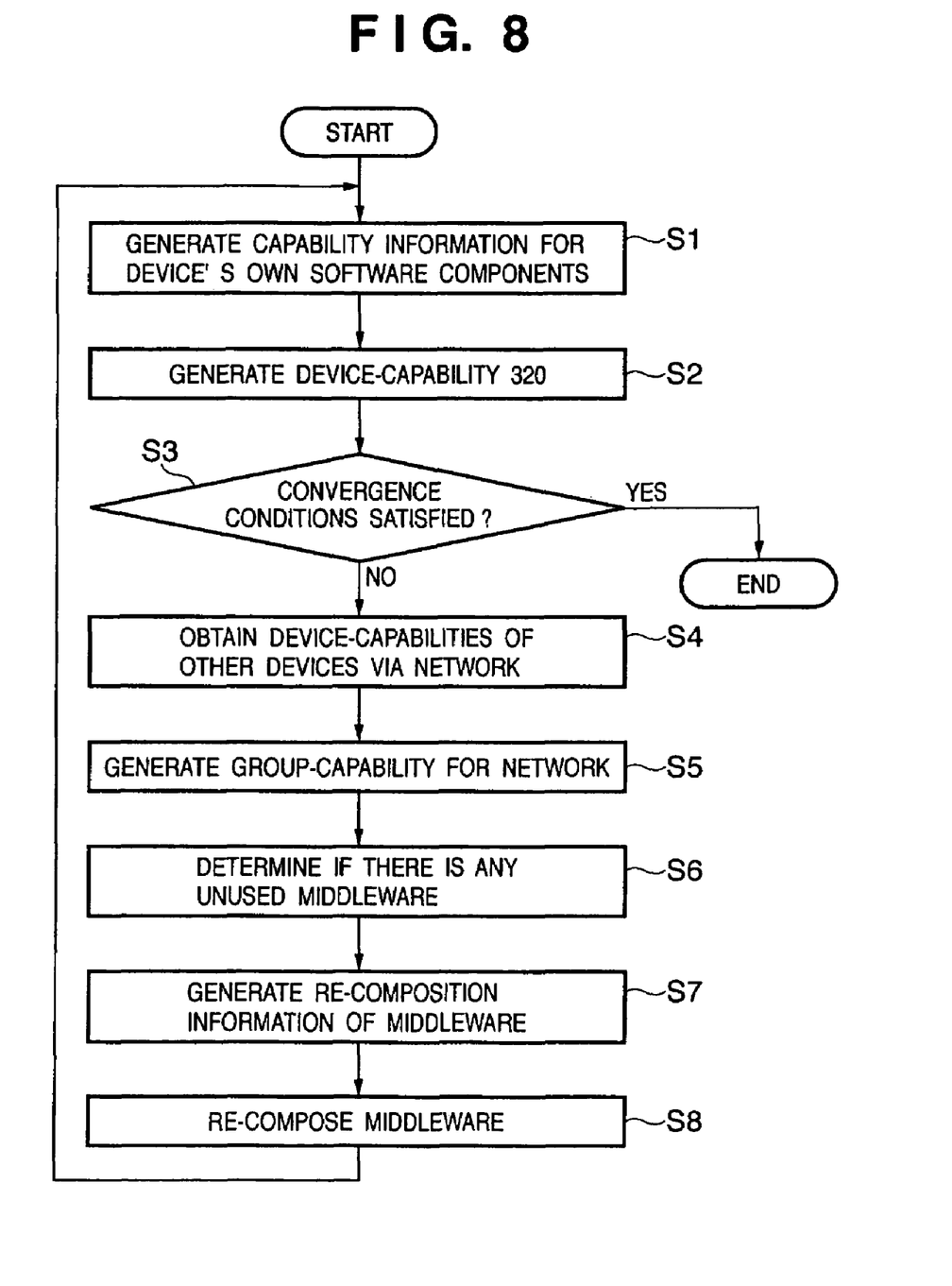
FIG. 8 is a flow chart describing the processing illustrated in FIGS. 3 to 5.

FIG. 8 is a flow chart describing the processing in FIGS. 3 to 5 as described above. The flow is implemented under a control of the CPU 110 in accordance with a program stored in the ROM 114.

First in step S1, the capability information in the operating system/firmware 302, the application 311 and the other software components stored in the color printer 100 is collected. Then, the software capability information 404 for the software components incorporated in the printer 100 is generated. This process is achieved by combining the information of the various types of software components stored in the printer 100 collected from the software capability manager 403 through the application manager 401 and the middleware manager 402 into the capability information 404. The various types of software components stored in the printer 100 include, for example, the application software 311, the middleware, the firmware, etc.

Next, in step S2, the device-capability 320 as the capability information of the printer 100 is generated based on the information collected in step S1 and is notified to the other devices 103, 104 over the network 105. This is implemented in the device-capability manager 405.

Next, in step S3, it is determined whether or not the convergence conditions of the optimization processing are satisfied, and if it is determined that the convergence conditions are satisfied, then it is terminated. The convergence conditions may be given, for example, by an elapsed processing time or recurrent processing times, however, the present invention does not place any constraints on the conditions. If it is determined that the convergence conditions are not satisfied and the optimization processing should continue in this step S3, the process proceeds to step S4 to obtain the device-capability 320 for each of the other devices 103, 104 on the network 105. Then, the obtained device-capabilities 320 are processed to generate the group-capability 321 which is given to a group of devices composed of the plurality of devices constituting the network 105 (step S5). This is implemented by the group capability manager 406.

Then, the process proceeds to step S6, where it is determined based on the group-capability 321 computed from the device-capabilities 320 of the respective devices whether the capabilities which none of the devices connected to the network 105 use exist. Then, in step S7, the middleware optimizer 408 generates the re-composition information of the middleware based on the unused middleware determined in step S6. Then, in step S8, dynamic re-composition of the middleware components, including activation and inactivation of the middleware, takes place using the re-composition information. This is implemented in the middleware re-composition manager 407. Specifically, the middleware re-composition manager 407, for example, rewrites the capability information 404 based on the re-composition information of the middleware generated in step S7. Further, the middleware manager 402 re-composes the middleware components according to the rewritten capability information 404. In this way, after completing step S8, the process goes back to step S1 and repeats the optimization processing.

It should be noted that the present invention may be applied to an apparatus consisting of a plurality of devices (e.g. a host computer and an interface device) or may be applied to an apparatus consisting of a single device.

The object of the present invention can also be accomplished by providing an apparatus or a computer of an apparatus with a medium on which software program code for implementing the capability of the above described embodiment is recorded, and reading and executing the program code stored in the recording medium by the apparatus or the computer (or the CPU or MPU) of the apparatus. In this case, the program code read from the recording medium itself is deemed to implement the capability of the above described embodiment, and the storage medium storing the program code constitutes the present invention.

For the storage medium for providing the program code, for example, floppy disks, hard disks, optical disks, magneto-optical disks, CD-ROMs, CD-Rs, magnetic tapes, non-volatile memory cards, ROMs and the like may be employed. The present invention may include not only a case where the capability of the above described embodiment is implemented by executing the program code read by the computer, but also a case where an OS (Operating System) running on the computer executes some or all of the actual processing based on the instructions in the program code such that the capability of the above described embodiment is achieved.

The present invention may further include a case where, after the program code read from the storage medium has been written into a memory in an expansion board inserted into the computer or an expansion unit connected to the computer, a CPU or the like provided on the expansion board or in the expansion unit executes some or all of the actual processing based on the instructions of the program code such that the capability of the above described embodiment is achieved.

If the present invention is applied to the above described storage medium, the storage medium will store the program code for carrying out the processes corresponding to the flow chart described above.

The present invention is not limited to the above embodiment, and various changes and modifications can be made thereto within the spirit and scope of the present invention. Therefore, to apprise the public of the scope of the present invention, the following claims are made.

This application claims the benefit of Japanese Application No. 2005-174248, filed Jun. 14, 2005, which is hereby incorporated by reference herein in its entirety.

What is claimed is:

1. A communication apparatus connected to a network, said apparatus comprising:
    a storage unit configured to store middleware for a function of the communication apparatus, wherein the function is described by functional information;
    a first collection unit configured to repeatedly collect first functional information of the communication apparatus;
    a second collection unit configured to repeatedly collect second functional information of apparatuses on the network; and
    a composition unit configured to compose and stop the middleware based on the first and second functional information repeatedly collected by said first and second collection units such that the middleware for a function that does not correspond to the second functional information of the apparatuses on the network is stopped,
    wherein said first collection unit repeatedly collects the first functional information of the communication apparatus whose middleware is composed and stopped by said composition unit.

2. An apparatus according to claim 1, wherein the second functional information includes information indicating the status/state of the apparatuses and information indicating the capability/ability of the apparatuses.

3. An apparatus according to claim 1, wherein said composition unit activates the middleware for implementing a function corresponding to the first and second functional information collected by said first and second collection units.

4. An apparatus according to claim 1, wherein said composition unit inactivates the middleware for a function not corresponding to the second functional information collected by said second collection units.

5. A control method of a communication apparatus which is connected to a network and stores middleware for a function of the communication apparatus, said method comprising:
    a first collection step of repeatedly collecting first functional information describing a function of the communication apparatus;
    a second collection step of repeatedly collecting second functional information describing a function of apparatuses on the network; and
    a composition step of composing and stopping the middleware based on the first and second functional information repeatedly collected in said first and second collection steps such that the middleware for a function that does not correspond to the second functional information of the apparatuses on the network is stopped,
    wherein, in said first collection step, the first functional information of the communication apparatus whose middleware is composed and stopped in said composition step, is repeatedly collected.

6. A method according to claim 5, wherein the second functional information includes information indicating the status/state of the apparatuses and information indicating the capability/ability of the apparatuses.

7. A method according to claim 5, wherein, in said composition step, the middleware for a function corresponding to the first and second functional information collected in said first and second collection steps is activated.

8. A method according to claim 5, wherein, in said composition step, the middleware for a function not corresponding to the second functional information collected in said second collection steps is inactivated.

9. A communication apparatus connected to a network, said apparatus comprising:
    a storage unit configured to store middleware for managing a document format, wherein the document format is related to functional information;
    a first collection unit configured to repeatedly collect first functional information relating to a document format of the communication apparatus;
    a second collection unit configured to repeatedly collect second functional information relating to a document format of apparatuses on the network; and
    a composition unit configured to activate inactivate the middleware for managing a document based on the first and second functional information repeatedly collected by said first and second collection units such that the middleware related to the document format that does not correspond to the second functional information of the apparatuses on the network is inactivated,
    wherein said first collection unit repeatedly collects the first functional information of the communication apparatus whose document was managed by the middleware activated or inactivated by said composition unit.

10. A control method of a communication apparatus which is connected to a network and stores middleware for managing a document format of the communication apparatus, wherein the document format is related to functional information, said method comprising:
    a first collection step of repeatedly collecting first functional information relating to a document format of the communication apparatus;
    a second collection step of repeatedly collecting second functional information related to a document format of apparatuses on the network; and
    a composition step of activating or inactivating the middleware for managing a document based on the first and second functional information repeatedly collected in said first and second collection steps such that the middleware for managing a document that does not correspond to the second functional information of the apparatuses on the network is inactivated,
    wherein, in said first collection step, the first functional information of the communication apparatus whose document was managed by the middleware activated or inactivated in said composition step, is repeatedly collected.

* * * * *